United States Patent [19]
Yamamura

[11] Patent Number: 6,112,583
[45] Date of Patent: Sep. 5, 2000

[54] POSITION DETECTOR FOR MOTOR

[75] Inventor: Kengo Yamamura, Kosai, Japan

[73] Assignee: ASMO Co., Ltd., Kosai, Japan

[21] Appl. No.: 08/964,415

[22] Filed: Nov. 4, 1997

[30] Foreign Application Priority Data

Nov. 5, 1996 [JP] Japan ................................ 8-292684

[51] Int. Cl.$^7$ ................................................ G01M 15/00
[52] U.S. Cl. ................................ 73/116; 49/28; 73/1.79
[58] Field of Search ........................ 73/1.79, 116; 49/27, 49/28, 72; 160/10, DIG. 4; 296/146.1, 216.01; 340/438, 485

[56] References Cited

U.S. PATENT DOCUMENTS

| | | | |
|---|---|---|---|
| 5,705,755 | 1/1998 | Yamamura | 73/862.191 |
| 5,762,579 | 6/1998 | Torii et al. | 477/11 |
| 5,773,947 | 6/1998 | Torii et al. | 318/466 |
| 5,791,204 | 8/1998 | Torii et al. | 74/606 R |
| 5,808,250 | 9/1998 | Torii et al. | 200/19 R |
| 5,818,358 | 10/1998 | Torii et al. | 341/16 |
| 5,823,905 | 10/1998 | Torii et al. | 475/149 |
| 5,875,588 | 3/1999 | Torii et al. | 49/349 |

FOREIGN PATENT DOCUMENTS

| | | |
|---|---|---|
| 0 290 622 | 11/1988 | European Pat. Off. . |
| 0 684 452 | 11/1995 | European Pat. Off. . |
| 2 122 773 | 9/1972 | France . |
| 23 44 297 | 3/1975 | Germany . |
| 8-29114 | 2/1996 | Japan . |
| 9-236431 | 9/1997 | Japan . |

*Primary Examiner*—Eric S. McCall
*Attorney, Agent, or Firm*—Burns, Doane, Swecker & Mathis, LLP

[57] ABSTRACT

A position detector for a motor includes a pulse plate, having a fitting hole, for generating pulse signal, a connection shaft having protrusion portions and a washer having a connection hole. Each protrusion portion of the connection shaft is inserted into the fitting hole of the pulse plate and further inserted into the connection hole of the washer, and top ends of each protrusion portions are fastened to the washer. Thus, even if a rotational torque transmitted from the connection shaft to the pulse plate becomes large, the rotational force of the connection shaft can be accurately transmitted to prevent only the connection shaft from idling without releasing the connection between the connection shaft and the pulse plate.

16 Claims, 6 Drawing Sheets

POSITION DETECTOR FOR MOTOR

CROSS-REFERENCE TO RELATED APPLICATION

This application is related to and claims priority from Japanese Patent Application No. 8-292684 filed on Nov. 5, 1996, the contents of which are hereby incorporated by reference.

BACKGROUND OF THE INVENTION

1. Field of the Invention

The present invention relates to a position detector for a motor used for, e.g., a power window device that opens and closes a vehicle door window glass up and down or a sunroof device that opens and closes a sunroof door.

2. Description of Related Art

A motor is used as a driving source for a power window device that opens and closes a vehicle door window glass up and down or a sunroof device that opens and closes a sunroof door.

In power window devices, a catch prevention function is provided to prevent accidental catching of a passenger's body and/or foreign objects between a window glass and a window frame. Among such power window devices equipped with the catch prevention function, some devices have a limit switch provided at a specified position in the door. These types of devices determine whether or not any obstacle has been caught by the window glass based on a signal from the limit switch and a lock current of a motor, to control movement of the window glass, i.e., the rotation position of the motor. Other devices have a Hall IC or a special commutator for detecting rotation number of an armature and determine whether or not any obstacle has been caught based on a rotation speed detection signal (e.g., pulse number or width of pulse signals) to control the rotation position of the motor.

However, in those power window devices (i.e., motor rotation position detection mechanism), cumbersome adjustment of assembling position is required when the motor and a window regulator are assembled, and cumbersome resetting after assembling work is also required. Further, when the catch prevention mechanism is provided, other additional expensive parts such as a control device is required, but the accuracy is not greatly improved.

In view of the foregoing problems, the applicant proposed a position detector for a motor for a moving body in JP-A-8-29114 and JP-A-9-236431.

The proposed position detector for the moving body includes: a planetary gear train unit having a ring gear which is rotatably held in a cover plate and planetary gears engaged with the ring gear; a switch portion having a moving contact which is formed integrally with the ring gear to rotate with the ring gear and a fixed contact which is fixed on the cover plate to contact the moving contact; and a clutch mechanism which can shut off the transmission of the rotation force in the forward direction from the moving body (i.e., output shaft of the motor) to the ring gear. Thus, the position of the window glass or the sunroof door can be accurately detected and the movement thereof can be controlled when the position detector is applied to the power window device or the sunroof device. Further, the initial position can be set readily without cumbersome positional adjustment, and these effects can be realized by a simple mechanism at a low cost.

In the above-described position detector for the motor of the moving body, a pulse plate is connected to a sun gear (i.e., a motor output shaft of the moving body) of the planetary hear train unit and is rotated integrally with the sun gear to generate pulse signals. Therefore, the generated pulse signals can be detected, and the moving position of a moving body can be linearly detected according to the detected signals. Thus, the position of the window glass can be detected when the position detector is applied to the power window device.

However, in the position detector, only the outer periphery of the sun gear is fitted to the pulse plate so that the pulse plate is integrally rotated with the motor output shaft of the moving body. That is, a fitting hole having an octangular shape is formed at a center portion of the pulse plate, a shaft portion of the sun gear is formed in an octangular shape to correspond to the fitting hole, and the shaft portion of the sun gear is inserted into the fitting hole to integrally connect the sun gear and the pulse plate. Because the shaft portion of the sun gear is inserted into the fitting hole so that the pulse plate is connected to the sun gear, it is difficult to increase the connection strength between the pulse plate and the sun gear. Thus, when a rotational torque transmitted from the sun gear to the pulse plate becomes large, the connection between the sun gear and the pulse plate can be released so that only the sun gear may be idling.

SUMMARY OF THE INVENTION

In view of the foregoing problems, it is an object of the present invention to provide a position detector where a pulse plate is tightly connected to a connection shaft of a sun gear to prevent only the connection shaft from idling without releasing the connection between the connection shaft and the pulse plate even if a rotational torque transmitted from the connection shaft to the pulse plate becomes large.

According to a first aspect of the present invention, a position detector includes a sun gear having a shaft and a protrusion portion protruding from the shaft. A pulse plate is connected to the sun gear in such a manner that the sun gear is inserted into a through hole of the pulse plate and a protrusion of the sun gear engages with a fitting portion of the pulse plate. Therefore, even if a rotational torque transmitted from the shaft to the pulse plate becomes large, the rotational force of the sun gear can be actually transmitted to prevent only the sun gear from idling without releasing the connection between the sun gear and the pulse plate.

Preferably, the fitting portion of the pulse plate is a recess portion extending radially outwardly in the pulse plate. Further, the protrusion portion extends radially outwardly to engage with the recess portion. Therefore, the sun gear and the pulse plate can be tightly connected.

According to a second aspect of the present invention, a position detector includes: a sun gear having a shaft and a protrusion portion protruding from the shaft; a pulse plate, having a first hole, for generating pulse signal; and a washer having a second hole and a fitting portion for fixing the pulse plate to the sun gear. The pulse plate is connected to the sun gear in such a manner that sun gear is inserted into the first and second holes and the protrusion of the sun gear engages with the fitting portion of the washer. Therefore, due to the fitting force between the protrusion portion of the sun gear and the pulse plate, the fastening force of the washer and the holding force between the sun gear and the washer, the pulse plate is tightly connected to the shaft of the sun gear. Therefore, even if a rotational torque transmitted from the shaft to the pulse plate becomes large, the rotational force of the sun gear can be actually transmitted to prevent only the sun gear from idling without releasing the connection between the sun gear and the pulse plate.

BRIEF DESCRIPTION OF THE DRAWINGS

Additional objects and advantages of the present invention will be more readily apparent from the following detailed description of preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
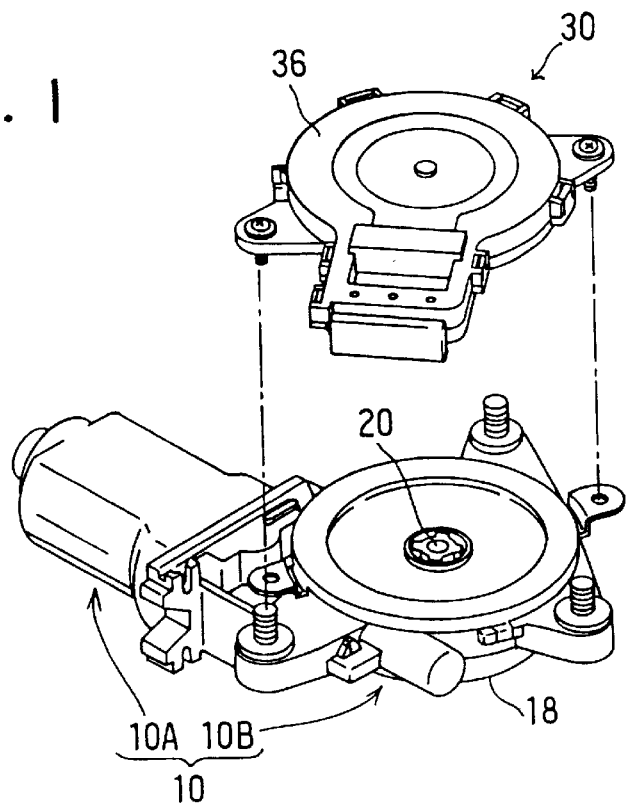
FIG. 1 is an overall perspective view of a motor for a power window device to which the embodiment of the present invention is applied.
Figure 2:
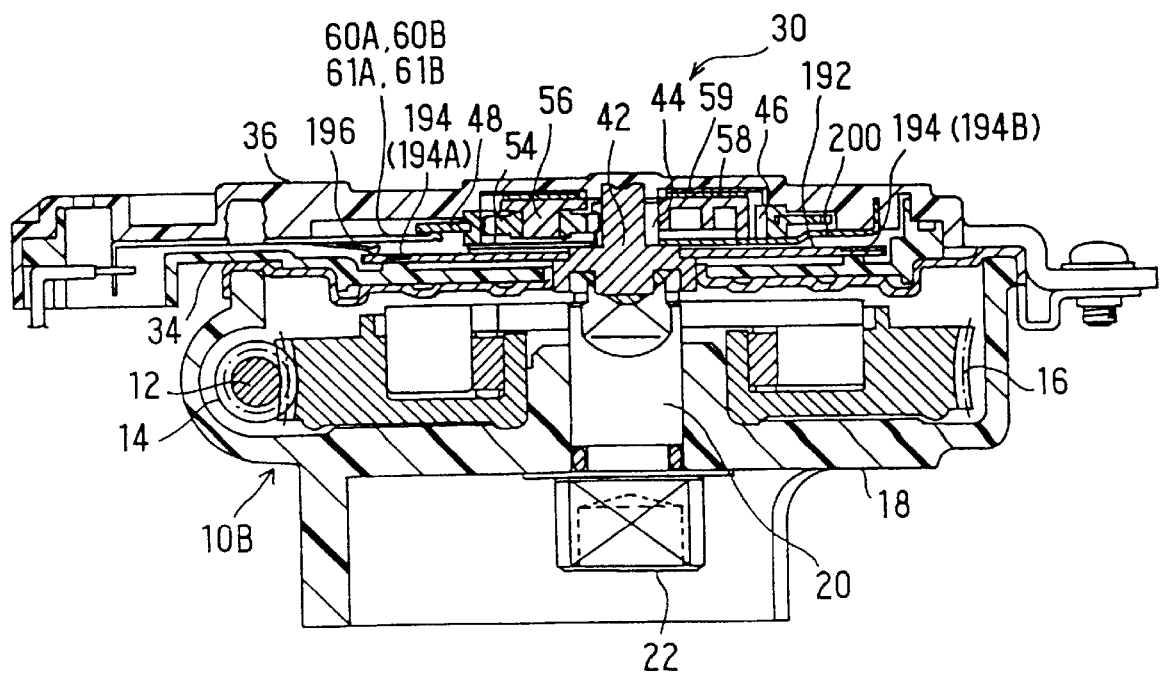
FIG. 2 is a cross-sectional view of the motor for the power window device to which the embodiment of the present invention is applied.

As shown in FIGS. 1 and 2, a motor 10 is composed of a motor portion 10A and a gear portion 10B connected to the motor portion 10A. A rotation shaft 12 of the motor portion 10A extends into the gear portion 10B, and a worm gear 14 is formed at the top end thereof. The worm gear 14 engages with a rotation gear wheel 16 disposed in the gear portion 10B. In the rotation gear wheel 16, a shaft 20 as a motor output shaft is rotatably supported by a cover 18 of the gear portion 10B. Thus, when the motor portion 10A is operated and the rotation shaft 12 is rotated, the rotation force of the motor portion 10A is transmitted to the rotation gear wheel 16 through the worm gear 14 so that the shaft 20 is rotated. An output fitting portion 22 is located at one axial end of the shaft 20, and is connected to a driving portion of a window regulator (not shown). In the embodiment, it is so set that, when the shaft 20 (output fitting portion 22) rotates from 3 to 4.5 rotations, for example, the window glass moves 1 stroke.

The position detector 30 is attached on the side opposite to the output fitting portion 22 of the gear portion 10B.

Figure 3:
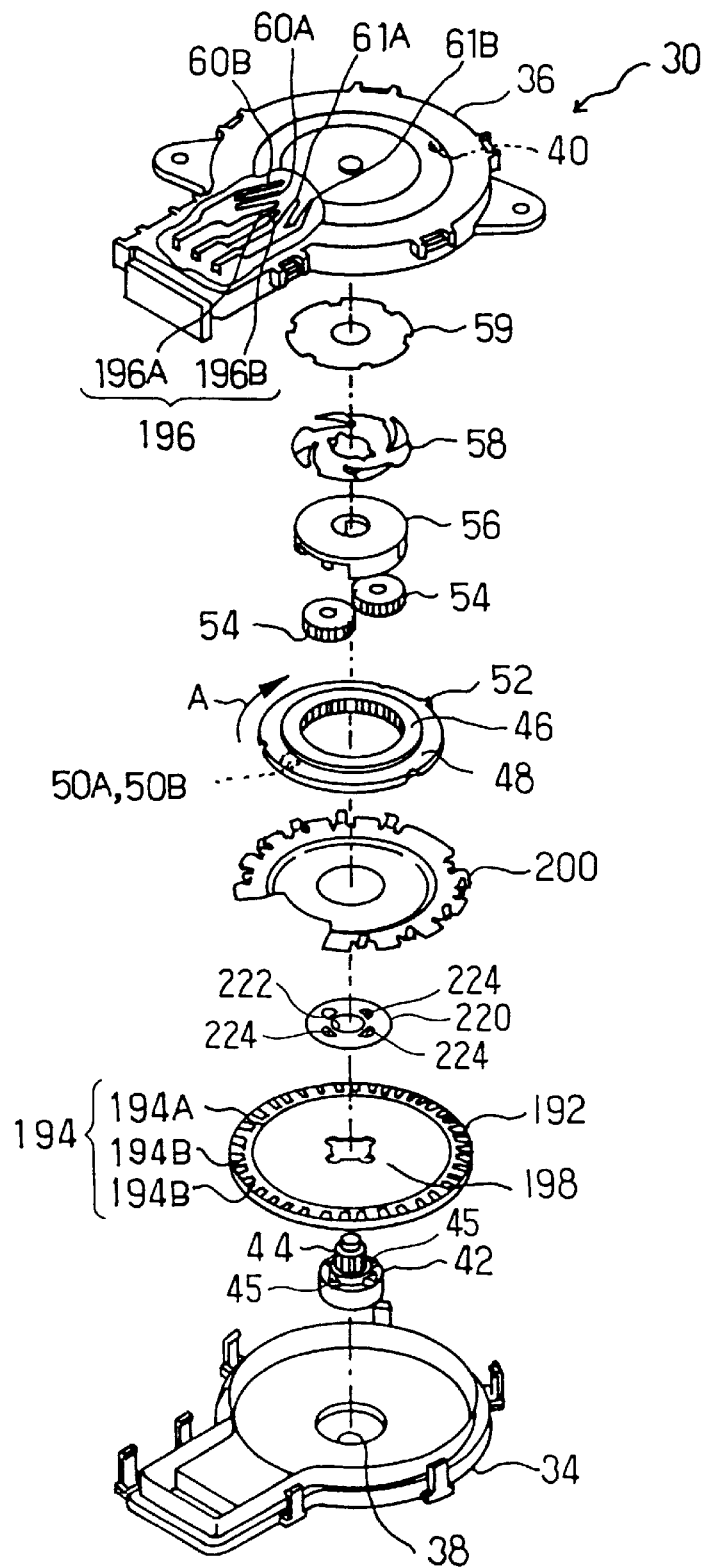
FIG. 3 is an exploded perspective view of a position detector in a disassembled condition according to the embodiment of the present invention.

As shown in FIGS. 2 and 3, the position detector 30 is equipped with a base plate 34 and a cover plate 36 and is formed approximately in a cylindrical shape having a thin wall. A through hole 38 is formed at a center portion of the base plate 34, and a protrusion 40 is formed on the inner peripheral surface of the cover plate 36 to extend in the axial direction.

Further, the position detector 30 is equipped with a connection shaft 42. One end of the connection shaft 42 is connected to the shaft 20 of the rotation gear wheel 16 to constantly rotate together with the shaft 20. The other end of the connection shaft 42 protrudes into the inside of the position detector 30 (i.e., within base plate 34 and the cover plate 36) via the through hole 38 formed in the base plate 34. Further, a sun gear 44 constituting a part of planetary gear train unit is provided proximate to the other end of the connection shaft 42, and engages with a pair of planetary gears 54. Further, a plurality of protrusion portions 45 (in the illustrated embodiment, four protrusion portions 45) are formed in the connection shaft 42 to be inserted into a fitting hole 198 of a pulse plate 192 and a connection hole 224 of a washer 220 described later.

At a periphery of the connection shaft 42, a ring gear 46 constituting a part of the planetary gear train unit is disposed to oppose the sun gear 44 radially. The ring gear 46 is rotatably held in the cover plate 36, and a flange portion 48 is formed integrally with an outer periphery of the ring gear 46. The flange portion 48 formed integrally with the ring gear 46 is a conductive plate and has moving contacts 50A and 50B formed on the opposite surface to the cover plate 36. The moving contacts 50A and 50B are non-conductive portions formed in arc shape having two steps, and are formed on the approximately same plane as the flange portion 48. Further, a protruding section 52 is formed on a portion of the periphery of the flange portion 48 to protrude radially outwardly therefrom. The protruding section 52 corresponds axially to the protrusion 40 formed on the cover plate 36, and is so configured that the protruding section 52 contacts the protrusion 40 at the time point when the ring gear 46 (flange portion 48) rotates in the forward direction (arrow A in FIG. 3) and arrives at a specified rotation position, and that further rotation of the ring gear 46 in the forward direction is stopped.

Figure 4:
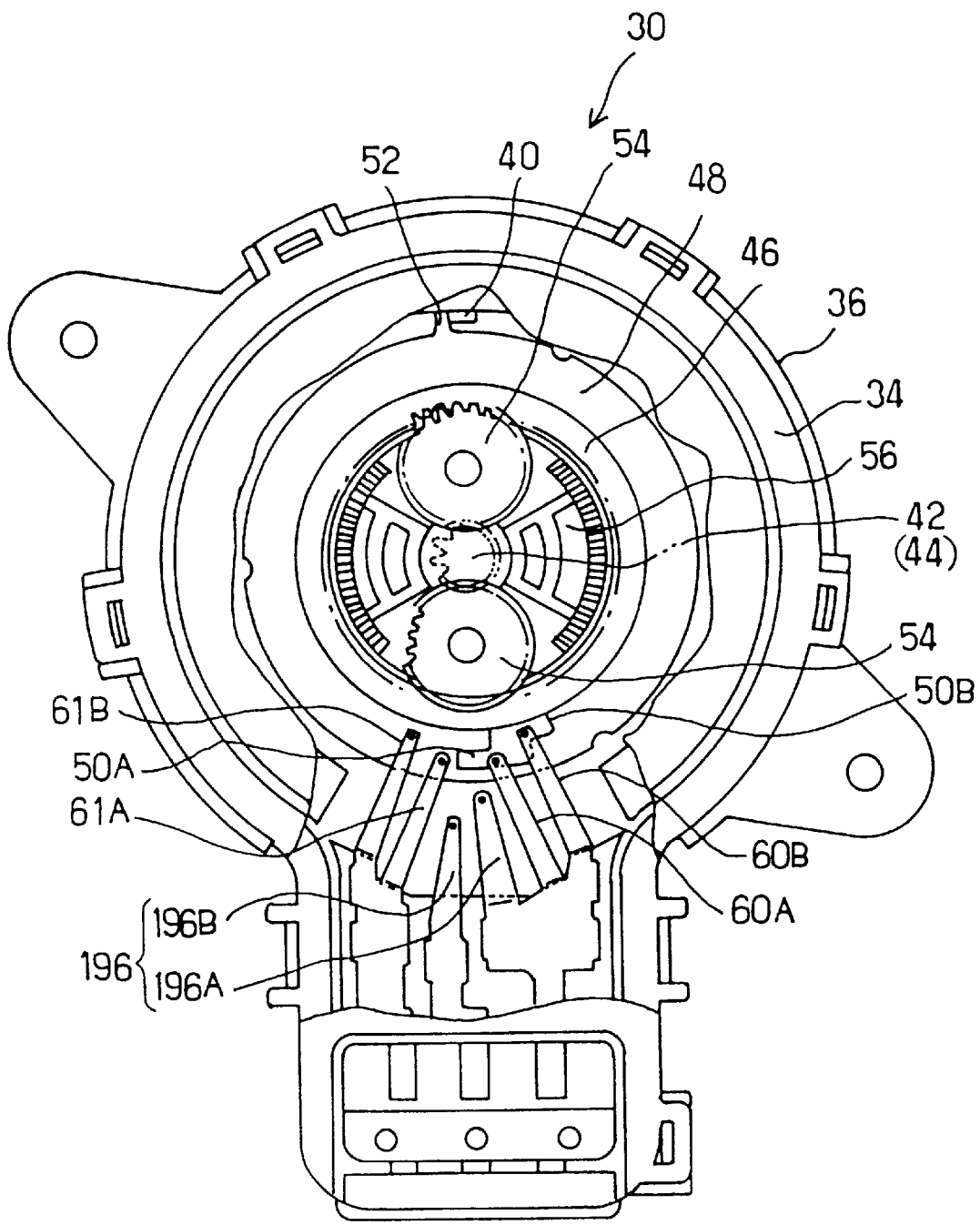
FIG. 4 is an enlarged view illustrating the corresponding relationship between a ring gear and a fixed contact of the position detector according to the embodiment of the present invention.

In the internal perimeter portion of the ring gear 46, two planetary gears 54 are disposed to revolve around the sun gear 44. As shown in FIG. 4, the planetary gears 54 are rotatably supported by a carrier 56 to engage with the ring gear 46 and the sun gear 44. In the embodiment, the sun gear 44, the ring gear 46 and the planetary gears 54 constitute the planetary gear train unit, which transmits the rotation of the connection shaft 42 (that is, shaft 20) through speed reduction. For example, when the revolution of the planetary gears 54 are stopped while the carrier 56 is maintained and fixed, the rotation of the connection shaft 42 (i.e., shaft 20) can be decelerated and is transmitted to the ring gear 46.

In the embodiment, the deceleration or speed reduction ratio of the planetary gear train unit composed of the sun gear 44, the ring gear 46 and the planetary gears 54 is 5.2:1, and the unit is so set that the ring gear 46 will not rotate for more than one rotation while a window glass make one stroke (while the sun gear 44 makes 3 to 4.5 rotations). The deceleration ratio of the planetary gear train unit is not limited to 5.2:1, however can be set to an arbitrary value as desired.

As shown in FIG. 3, the planetary gear train unit including the sun gear 44, the ring gear 46 and the planetary gears 54 is covered by the cover plate 36 and is held on a protective plate 200, so that it prevent the planetary gear train unit from being separated from the cover plate 36. A spring washer 58 and a washer 59 constituting a clutch mechanism are disposed between the cover plate 36 and the carrier 56. The spring washer 58 is attached integrally to the carrier 56, the washer 59 is press-fitted in the cover plate to integrate with an inner peripheral surface of the cover plate 36, and the spring washer 58 contacts the washer 59 in a compression state. Thus, the spring washer 58 constantly presses the carrier 56 so that the carrier 56 contacts the protective plate 200. Therefore, normally, the rotation of the carrier 56 is stopped by the pressing force of the spring washer 58 (i.e., by the frictional force between the carrier 56 and the protective plate 200, and the frictional force between the spring washer 58 and the washer 59), and the revolution of the planetary gears 54 around the sun gear 44 is stopped on the other hand, when the protruding section 52 of the flange portion 48 of the ring gear 46 contacts the protrusion 40 and the further rotation of the ring gear 46 in the forward direction A is stopped, the forward direction rotation force of the sun gear 44 surpassing the pressing force (maintaining force) of the carrier 56 acts so that the spring washer 58 releases the maintenance of the carrier 56 and the planetary gears 54 can perform the revolution around the sun gear 44. That is, after the protruding section 52 of the flange portion 48 contacts the protrusion 40, the spring washer 58 can interrupt the transmission of the forward direction rotation force from the sun gear 44 (i.e., the shaft 20) to the ring gear 46. Thus, in the case where the protruding section 52 contacts the protrusion 40 so that the rotation of the ring gear 46 is stopped, when the sun gear 44 (i.e., the shaft 20) rotates in the forward direction (i.e., the direction to rotate the ring gear 46 in the forward direction A), only the planetary gears 54 revolve to rotate the carrier 56 against the biasing force of the spring washer 58.

A pair of fixed contacts 60A and 61A and another pair of fixed contacts 60B and 61B are attached onto the cover plate 36. Each pair of the fixed contacts 60A and 61A and the fixed contacts 60B and 61B are made of contact-plates having elasticity and electric conductivity. The fixed contact 60A is formed integrally with the fixed contact 60B, and the fixed contact 61A is formed integrally with the fixed contact 61B. One end of each pair of the fixed contacts 60A and 61A and the fixed contacts 60B and 61B is fixed to the cover plate 36 and each top end thereof extends toward the flange portion 48 of the ring gear 46 to elastically contact the flange portion 48 (i.e., the side surface opposite to the cover plate 36). The fixed contacts 60A and 61A and the fixed contacts 60B and 61B are pressed to the flange portion 48 having the moving contacts 50A and 50B of the ring gear 46 from the side opposite to the cover plate 36.

The fixed contacts 60A and 61A and the fixed contacts 60B and 61B contact the non-conductive moving contacts 50A and 50B at the specified rotation position of the ring gear 46. As shown in FIG. 4, the fixed contacts 60A and 61A are positioned to contact the radially outside moving contact 50A, and the fixed contacts 60B and 61B are positioned to contact the radially inside moving contact 50B.

Further, the fixed contacts 60A and 61A and the fixed contacts 60B and 61B are electrically connected to a control circuit (not shown) of the power window device, and the moving contacts 50A and 50B contact together the fixed contacts 60A and 60B to be in a non-conducting state, so that the rotation position of the ring gear 46, that is, the rotation position of the sun gear 44 or the shaft 20 can be detected.

The embodiment is so designed that, for example, at a point when the window glass moves to 4 mm below the upper stop position, the protruding section 52 reaches a specified rotation angle position displaced from the position which is attained when the protruding section 52 contacts the protrusion 40, and at this point, the moving contacts 50A and 50B contact the fixed contacts 60A and 60B to be become non-conductive. Further, the non-conductive state can be maintained until the protruding section 52 contacts the protrusion 40.

Alternatively, it may be so designed that when the window glass moves to 4 mm below the upper stop position and the protruding section 52 reaches the specified angle position from the rotation angle which is attained when the protruding section 52 contacts the protrusion 40, the moving contacts 50A and 50B contact together the fixed contacts 60A and 61A and the fixed contacts 60B and 61B to become conductive, so that the position detection may be performed. Further, after the conduction state or the non-conduction state is achieved as described above, it is not always necessary to electrically maintain such conduction state and non-conduction state. By detecting a trigger signal generated from the contact between the moving contacts 50 A and 50B and each pair of the fixed contacts 60A and 61A and the fixed contacts 60B and 61B, it can be determined that the protruding section 52 reaches a specified rotation position.

Further, as shown in FIG. 3, the position detector 30 includes a pulse plate 192 for generating pulse signals and a sliding contact 196 for detecting the pulse signals generated by the pulse plate.

Figure 5:
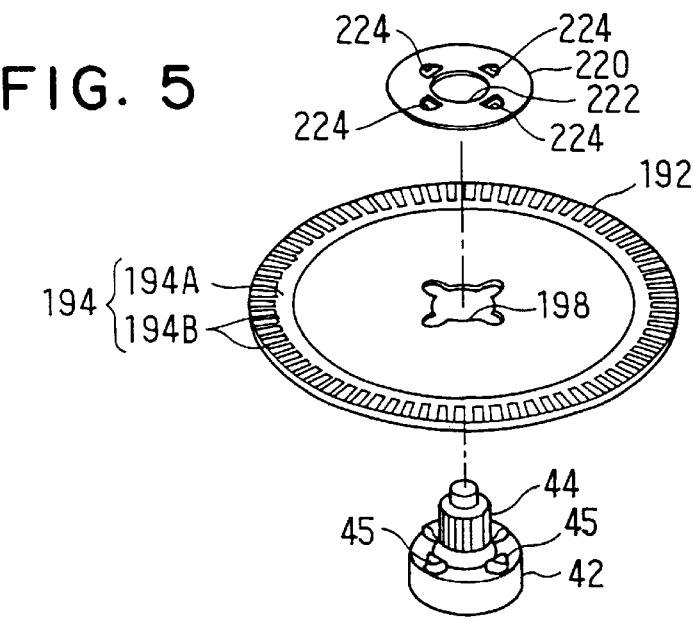
FIG. 5 is an exploded perspective view illustrating a pulse plate, a connection shaft and a washer of the position detector.

As shown in FIG. 5, the pulse plate 192 is formed in a thin circular shape, and a fitting hole 198 is formed approximately in a cross shape at a central portion of the pulse plate 192 to correspond to the connection shaft 42 and the protrusion portions 45 formed on the connection shaft 42. The connection shaft 42 and the protrusion portions 45 are inserted into the fitting hole 198 of the pulse plate 192. Further, a washer 220 is disposed to be opposite to the connection shaft 42 relative to the pulse plate 192, and the pulse plate 192 is held by the washer 220 and the connection shaft 42. A through hole 222 corresponding to the sun gear 44 and connection holes 224 corresponding to the protrusion portions 45 of the connection shaft 42 are formed in the washer 220, and the sun gear 44 and each protrusion portion 45 are inserted into the through hole 222 and the connection holes 224. That is, the protrusion portions 45 of the connection shaft 42 of the sun gear 44 are inserted into the fitting hole 198 of the pulse plate 192 and further inserted into the connection holes 224 of the washer 220 so that each top end of the protrusion portions 45 is fastened to the washer 220. Therefore, the pulse plate 192 is integrally connected to the connection shaft 42 of the sun gear 44, and thereby the pulse plate 192 is always rotated integrally with the connection shaft 42.

Further, a conduction portion 194 is formed on the pulse plate 192. The conduction portion 194 is formed along the perimeter direction of the pulse plate 192 in the periphery, and includes a ring-shaped first conduction portion 194A and a second conduction portion 194B which is adjacent to the first conduction portion 194A and has a continued pulse-shaped notches.

On the other hand, as shown in FIG. 3, a base portion of the sliding contact 196 is fixed to the cover plate 36 and extends toward the conduction portion 194 of the pulse plate 192, and the sliding contact 196 is composed of an input contact 196A constantly contacting the first conduction portion 194A of the conduction portion 194 and an output contact 196B contacting the second conduction portion 194B of the conduction portion 194. Thus, the pulse signal can be detected as the pulse plate 192 rotates. The detected pulse signal is used for a moving position control of a moving body (e.g., the window glass).

The conduction portion 194 may be formed on the side wall of the periphery of the pulse plate 192 instead of the upper surface thereof. In this case, the sliding contact 196 is fixed to the cover plate 36 to oppose the side peripheral wall of the pulse plate 192.

Further, the protective plate 200 is disposed between the pulse plate 192 and the ring gear 46 (i.e., the flange portion 48). The periphery of the protective plate 200 is fixed to the cover plate 36 and holds the ring gear 46, the carrier 56 and the like to prevent these parts from being separated from the cover plate 36. Further, because the protective plate 200 is interposed between the pulse plate 192 and the ring gear 46 (i.e., flange portion 48), the protective plate 200 limits the movements of the pulse plate 192 and the ring gear 46 so as not to contact the two parts with each other.

Figure 6:
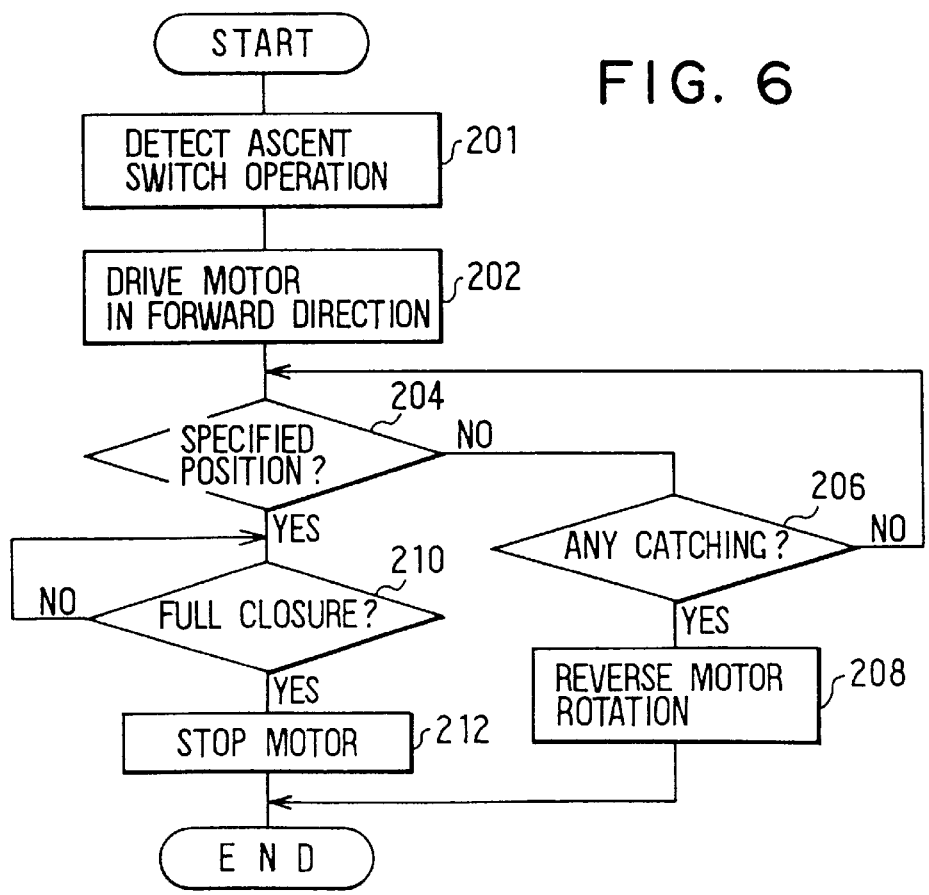
FIG. 6 is a flow chart illustrating a control process when a window glass ascends by the operation of an ascent switch of the power window device to which the present invention is applied.

Next, an operation of the embodiment is described with reference to the flowchart shown in FIG. 6 with respect to the case in which the window glass moves upward in response to the operation of an ascent switch of the power window device, for example.

In the motor 10 and the position detector 30 described above, when the operation of the ascent switch of the power window device is detected at a step 201, the motor 10 is driven to rotate the shaft 20 at a step 202 so that the window regulator is actuated and the window glass is raised.

Normally (while the window glass is ascending), the carrier 56 is pressed by the spring washer 58 and held stationary, so that the revolution of the planetary gears 54 around the sun gear 44 is stopped. Thus, with the rotation of the shaft 20, the rotation force of the connection shaft 42 (that is, the sun gear 44) is decelerated through the planetary gears 54 which rotates around the shafts 55 and is transmitted to the ring gear 46. Thus, the ring gear 46 gradually starts rotating in the forward direction A.

Next, at a step 204, whether or not the motor 10 reaches a specified rotation position, that is, whether or not the window glass reaches a specified position (4 mm below the upper stop position) is detected by the signal from the position detector 30.

That is, in the position detector 30, with the rotation of the shaft 20, the rotation force of the connection shaft 42 (that is the sun gear 44) is decelerated through the planetary gears 54 and transmitted to the ring gear 46, so that the ring gear 46 gradually starts rotating in the forward direction. However, when the window glass does not reach the position 4 mm below the upper stop position, the protruding section 52 is greatly separated from the protrusion 40, so that the moving contact 50 is away from each pair of the fixed contacts 60A and 61A and fixed contacts 60B and 61B so as to be in a non-conduction state. Thus, the rotation position of the shaft 20 (the fact that the window glass does not reach the position 4 mm below the upper stop position) is detected. In this case (NO), with the motor 10 being actuated, the process moves at a step 206, and it is detected whether or not the window catches something based on a change of the pulse signal generated from the conduction portion 194 and the sliding contact 196 with the rotation of the pulse plate 192. When the step 206 detects that something is caught (YES), the motor 10 is rotated in the reverse direction at a step 208, so that the window glass descends. On the other hand, when the step 206 determines that nothing is caught (NO), the process returns to the step 204.

When the window glass reaches the position 4 mm below the upper stop position (YES), the protruding section 52 reaches a specified position displaced from the rotation angle where the protruding section 52 contacts the protrusion 40. Further, at this point, the moving contacts 50A and 50B contact together the fixed contacts 60A and 60B, and thus the rotation position (the fact that the window glass reaches the position 4 mm below the upper stop position) of the shaft 20 is detected (YES) at step 204.

The process moves at step 210 to determine whether or not the window glass is fully closed based on the pulse signals generated by the rotation of the pulse plate 192 and the lock current of the motor 10. When the full closure of the window glass is detected, the motor 10 is stopped at a step 212 and the process is completed.

Thus, in the position detector 30, by the moving contacts 50A and 50B rotating together with the ring gear 46 and each pair of fixed contacts 60A and 61A and fixed contacts 60B and 61B, the rotation position of the shaft 20, that is, the position of the window glass (whether or not it reaches the position 4 mm below the upper stop position) can be accurately detected.

Further, in the position detector 30, by sufficiently rotating the shaft 20 of the motor 10 in the forward direction once at the time of installing in the vehicle, it can be automatically set to an initial state in which the moving contacts 50A and 50B contact the fixed contacts 60A and 60B.

That is, when the shaft 20 of the motor 10 is sufficiently rotated in the forward direction once at the time of assembling to the vehicle, the protruding section 52 of the flange portion 48 of the ring gear 46 contacts the protrusion 40 so that any further rotation of the ring gear 46 in the forward direction is stopped. When the shaft 20 further rotates under this condition, the rotation force of the sun gear 44 surpassing the pressing force (a holding force) acts, and the spring washer 58 cancels the holding of the carrier 56 so that the revolution of the planetary gears 54 can be performed. That is, because the spring washer 58 can shut off the transmission of the rotation force in the forward direction from the sun gear 44 (the shaft 20) to the ring gear 46 after the protruding section 52 of the flange portion contacts the protrusion 40, the rotation of the ring gear 46 is stopped. When the sun gear 44 (the shaft 20) rotates in the forward direction (the direction in which the ring gear 46 is to move in the forward direction) in this case wherein the protruding section 52 contacts the protrusion 40, only the planetary gears 54 revolve. Thus, after the protruding section 52 contacts the protrusion 40 and the moving contacts 50A and 50B contact the fixed contacts 60A and 60B, the ring gear 46 does not move even if the shaft 20 of the motor 10 rotates in the forward direction, and the contact state between the moving contacts 50A and 50B and the fixed contacts 60A and 60B is maintained. That is, by sufficiently rotating the shaft 20 of the motor in the forward direction once, it is automatically set to the initial state in which the protruding section 52 contacts the protrusion 40 and the moving contacts 50A and 50B contact the fixed contacts 60A and 60B.

Thus, by sufficiently rotating the shaft 20 of the motor 10 in the forward direction once at the time of installing in the vehicle, the position detector 30 is automatically set to the initial state in which the protruding section 52 contacts the protrusion 45 and the moving contacts 50A and 50B contact the fixed contacts 60A and 60B. Thus, the initial position can be readily set without cumbersome positional adjustment in assembling work and the cumbersome resetting after the assembling work, and further, the move control of the window glass can be accurately performed without fail.

Further, in the position detector 30 of the embodiment, with the rotation of the pulse plate 192, the output contact 196B repeats the contact/non-contact to the second conduction portion 194B of the conduction portion 194 so that the pulse signal is detected. Thus, by the detected pulse signal, the rotation speed of the shaft 20 of the motor 10 can be detected linearly.

Thus, when the position detector 30 is used for the power window device for a vehicle having a catch prevention function, for example, the moving position and the moving speed of the window glass can be constantly detected and controlled linearly.

Further, In the embodiment, the pulse plate 192 is held by the connection shaft 42 and the washer 220 at a position connecting the connection shaft 42 and the pulse plate 192. That is, the protrusion portions 45 on the connection shaft 42 of the sun gear 44 are inserted into the fitting hole 198 of the pulse plate 192 and are further inserted into the connection holes 224 of the washer 220, and each top end of the protrusion portions 45 is fastened to the washer 220 when the pulse plate 192 is held between the connection shaft 42 and the washer 220. Thus, the pulse plate 192 and the connection shaft 42 can be tightly connected with each other by a fitting force between each protrusion portion 45 of the connection shaft 42 and each fitting hole 198 of the pulse plate 192, a fastening force of the protrusion portions 45 fastening to the washer 220, and a holding force due to the connection shaft 42 and the washer 220.

Thus, the connection between the sun gear 44 and the pulse plate 192 can be sufficiently maintained to improve durability of the position detector 30. Further, even if a rotational torque transmitted from the sun gear 44 to the pulse plate 192 becomes large, the rotational force of the sun gear 44 can be accurately transmitted to prevent only the sun gear 44 from idling without releasing the connection between the sun gear 44 and the pulse plate 192.

In the position detector 30 of the embodiment, the initial position can be set readily in a low cost without cumbersome positional adjustment in the assembling work and cumbersome resetting after the assembling work, and the connection between the sun gear 44 and the pulse plate 192 can be sufficiently maintained to accurately transmit torque of the sun gear 44 and to prevent the sun gear 44 from idling.

Although the present invention has been fully described in connection with preferred embodiment thereof with reference to the accompanying drawings, it is to be noted that various changes and modifications will become apparent to those skilled in the art.

Figure 7:
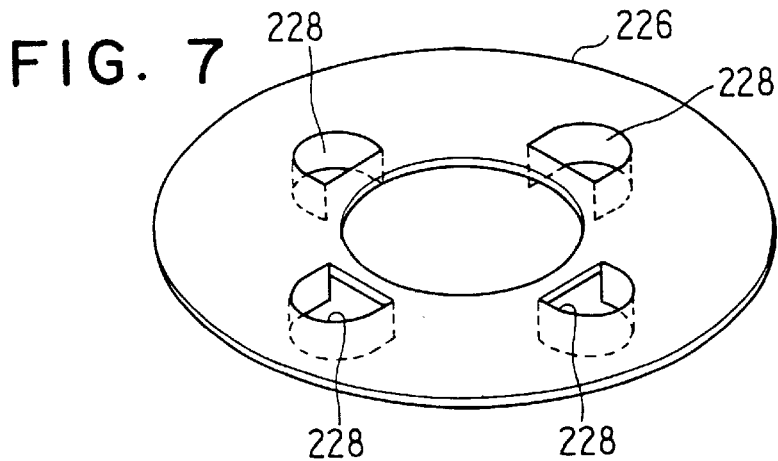
FIG. 7 is a perspective view showing an another washer applied to the position detector of the present invention.
Figure 8:
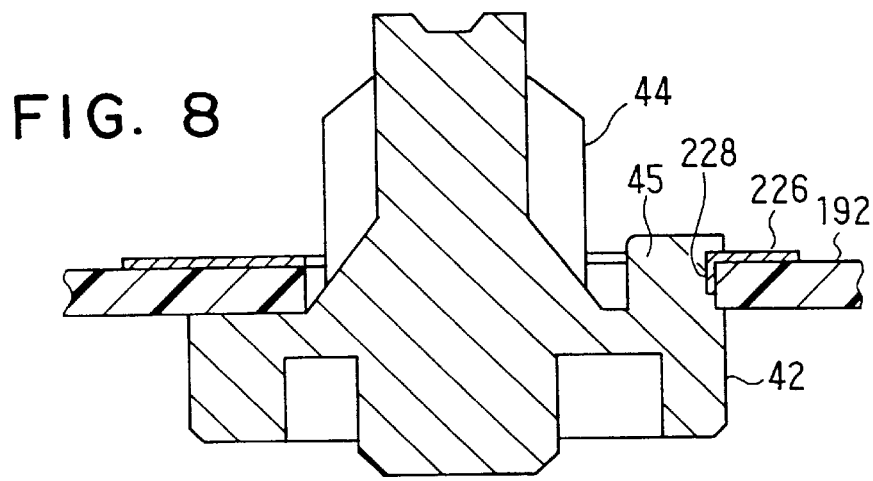
FIG. 8 is a cross-sectional view showing the connection shaft and the pulse plate connected to the connection shaft through the washer.

For example, in the above-described embodiment, each connection hole 224 formed in the washer 20 to correspond to each protrusion portion 45 is a simple through hole. However, each connection hole 228 of the washer 226 may be formed as shown in FIGS. 7 and 8, through a burring process. In this case, when each top end of the protrusion portions 45 is fastened to the washer 226 so that the pulse plate 192 is integrally connected to the connection shaft 42 (i.e., sun gear 44), each top end of the protrusion portions 45 can be securely fastened to the washer 226 without damaging the pulse plate 192 due to the fastening of each top end of the protrusion portions 45. Thus, the pulse plate 192 is securely fastened to the connection shaft 42.

Figure 9:
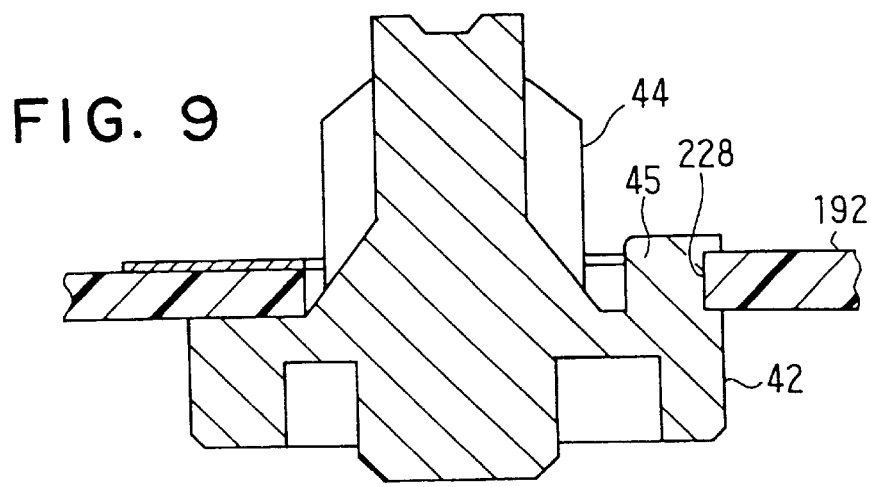
FIG. 9 is a cross-sectional view showing the connection shaft and the pulse plate connected to the connection shaft without using the washer.

As shown in FIG. 8, the pulse plate 192 is inserted into the connection hole 228 through the washer 226 so that the pulse plate 192 is tightly connected to the connection shaft 42. However, as shown in FIG. 9, the pulse plate 192 may be directly inserted into the connection hole 228. That is, the pulse plate 192 may be formed similarly to washer, and the protrusion portions 45 of connection shaft 42 of the sun gear 44 may be directly engaged with the pulse plate 192 so that the top end portions of the protrusion portions 45 are fastened to the pulse plate 192.

Figure 10:
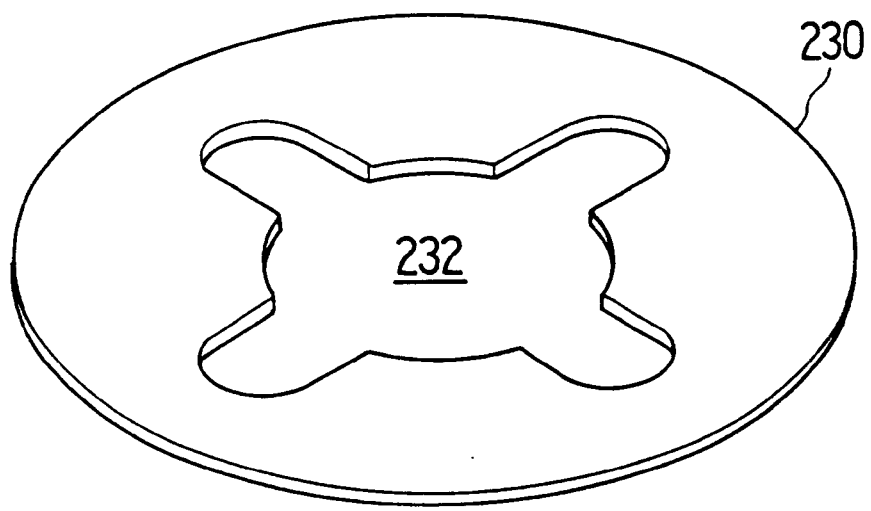
FIG. 10 is a perspective view showing the other washer applied to the position detector of the present invention.

In the above-described embodiment, the through hole 222 corresponding to the sun gear 44 and the connection holes 224 are separately formed in the washer 220. However, the through hole 222 and the connection holes 224 of the washer 220 may be formed continuously as shown in FIG. 10. That is, the washer 230 has a cross-shaped hole 232 similar to the fitting hole 198 formed in the pulse plate 192.

Figure 11:
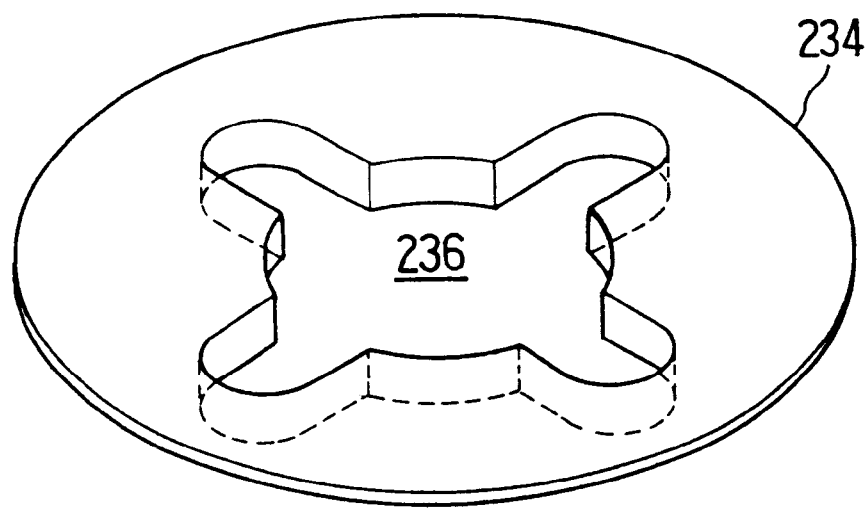
FIG. 11 is a perspective view showing the other washer applied to the position detector of the present invention.

Further, a cross-shaped hole 236 may be formed in a washer 234 through a burring process as shown in FIG. 11. Due to the washer 234 having the through hole 236, the pulse plate 192 and the connection shaft 42 are further securely connected to each other.

In the above-described embodiment, the position detector 30 is directly applied in the motor 10 for the power window device. However, the position detector 30 is not limited to this direct application, and can be applied in the other mechanisms and positions. For example, the position detector 30 may be installed at a rotation shaft such as an X-arm type rotation support shaft of the window regulator. Further, the position detector 30 may be installed at a wire-wound pulley of a wire type window regulator. Even in these cases, the position of the window glass can be detected accurately and the move control can be performed accurately, further, the initial position can be set readily without cumbersome positional adjustment in the assembling work and cumbersome resetting after the assembling work.

As described above, the present invention can accurately detect the position of the moving body for a power window device, a sun roof device or the like. The initial position can be set readily without cumbersome positional adjustment, and the present invention can be realized by a simple mechanism at a low cost. Further, the connection between the sun gear and the pulse plate can be sufficiently maintained to accurately transmit a rotational force of the sun gear 44 without idling the sun gear 44.

Such changes and modifications are to be understood as being within the scope of the present invention as defined by the appended claims.

What is claimed is:

1. A position detector for a motor for detecting a specified moving position of a moving body in forward and reverse directions, said detector comprising:

a cover plate;

a planetary gear train unit including a ring gear rotatably held in said cover plate, planetary gears engaged with said ring gear, and a sun gear engaged with said planetary gears, said unit being operatively linked with said moving body through a moving force transmitted from said moving body when said moving body moves;

a switch portion including a moving contact formed integrally with said ring gear for rotating together with said ring gear and a fixed contact fixed in said cover plate and formed to contact said moving contact, said switch portion being for detecting a specified moving position of said moving body through operation of contacts that turn ON and OFF;

a clutch mechanism operatively linked to said planetary gear train unit to stop a revolution of said planetary gears until said switch portion is actuated so that the moving force of said moving body is transmitted from said planetary gears to said ring gear to rotate said ring gear and, to shut off transmission of said moving force in a forward direction from said moving body to said ring gear by the revolution of said planetary gears after said switch portion is actuated;

a pulse plate for generating pulse signal with an operation of said planetary gear train unit, said pulse plate having a through hole and a fitting portion for fixing said pulse plate to said sun gear of said planetary gear train unit; and pulse signal detection unit for detecting a pulse signal generated in said pulse plate, wherein:

said sun gear includes:

a shaft portion having a contacting surface for contacting said pulse plate;

an insertion portion extending from said shaft portion in a rotation axial direction at a center portion of said shaft portion, and being inserted into said through hole of said pulse plate; and a protrusion portion protruding from said contacting surface of said shaft portion in said rotation axial direction around said insertion portion, said protrusion portion being engaged with said fitting portion of said pulse plate.

2. The position detector according to claim 1, wherein said fitting portion of said pulse plate is a fitting hole.

3. The position detector according to claim 2, wherein said through hole and said fitting hole of said pulse plate are a continuous hole.

4. The position detector according to claim 1, wherein:

said pulse plate has a circular shape;

said through hole is at a center of said pulse plate; and said fitting portion is proximate to said through hole.

5. The position detector according to claim 1, wherein said fitting portion of said pulse plate is a recess portion extending radially outwardly in said pulse plate.

6. The position detector according to claim 5, wherein said protrusion portion of said sun gear extends radially outwardly to engage with said recess portion.

7. The position detector according to claim 1, wherein:

said fitting portion of said pulse plate has a plurality of recesses extending radially outwardly; and said protrusion portion of said sun gear has a plurality of protrusions to engage with said recesses.

8. A position detector for a motor for detecting a specified moving position of a moving body in forward and reverse directions, said detector comprising:

a cover plate;

a planetary gear train unit including a ring gear rotatably held in said cover plate, planetary gears engaged with said ring gear, and a sun gear engaged with said planetary gears, said unit being operatively linked with said moving body through a moving force transmitted from said moving body when said moving body moves;

a switch portion including a moving contact formed integrally with said ring gear for rotating together with said ring gear and a fixed contact fixed in said cover plate and formed to contact said moving contact, said switch portion being for detecting a specified moving position of said moving body through operation of contacts that turn ON and OFF;

a clutch mechanism operatively linked to said planetary gear train unit to stop a revolution of said planetary gears until said switch portion is actuated so that the moving force of said moving body is transmitted from said planetary gears to said ring gear to rotate said ring gear and, to shut off transmission of said moving force in a forward direction from said moving body to said ring gear by the revolution of said planetary gears after said switch portion is actuated;

a pulse plate, having a first hole, for generating pulse signal with an operation of said planetary gear train unit;

a pulse signal detection unit for detecting a pulse signal generated in said pulse plate;

a washer having a second hole and a fitting portion for fixing said pulse plate to said sun gear of said planetary gear train unit, wherein:

said sun gear includes:

a shaft portion having a contacting surface for contacting said pulse plate;

an insertion portion extending from said shaft portion in a rotation axial direction at a center portion of said shaft portion, and being inserted into said first and second holes; and a protrusion portion protruding from said contacting surface of said shaft portion in said rotation axial direction around said insertion portion, said protrusion portion being engaged with said fitting portion of said washer.

9. The position detector according to claim 8, wherein said fitting portion of said washer is a fitting hole.

10. The position detector according to claim 9, wherein said second hole and said fitting hole of said washer are a continuous hole.

11. The position detector according to claim 8, wherein:

said washer has a circular shape;

said second hole is at a center of said washer; and said fitting portion is proximate to said second hole.

12. The position detector according to claim 8, wherein said fitting portion of said washer is a recess portion extending radially outwardly in said washer.

13. The position detector according to claim 12, wherein said protrusion portion of said sun gear extends radially outwardly to engage with said recess portion.

14. The position detector according to claim 8, wherein:

said fitting portion of said washer has a plurality of recesses extending radially outwardly; and said protrusion portion of said sun gear has a plurality of protrusions to engage with said recesses.

15. A motor actuating device comprising:

a motor having a housing and an output shaft; and a position detector held in said housing and connected to said motor, for detecting a specified moving position of a moving body in forward and reverse directions, said position detector comprising:

a planetary gear train unit including a ring gear rotatably held in a cover plate, planetary gears engaged with said ring gear, and a sun gear engaged with said planetary gears, said unit being operatively linked with said moving body through a moving force transmitted from said moving body when said moving body moves;

a switch portion including a moving contact formed integrally with said ring gear for rotating together with said ring gear and a fixed contact fixed in said cover plate and formed to contact said moving contact, said switch portion being for detecting a specified moving position of said moving body;

a clutch mechanism operatively linked to said planetary gear train unit to stop a revolution of said planetary gears until said switch portion is actuated so that the moving force of said moving body is transmitted from said planetary gears to said ring gear to rotate said ring gear and, to shut off transmission of said moving force in a forward direction from said moving body to said ring gear by the revolution of said planetary gears after said switch portion is actuated;
a pulse plate, having a first hole, for generating pulse signal with an operation of said planetary gear train unit;
a pulse signal detection unit for detecting a pulse signal generated in said pulse plate;
a washer having a second hole and a fitting portion for fixing said pulse plate to said sun gear of said planetary gear train unit, wherein:

said sun gear includes:
a shaft portion having a contacting surface for contacting said pulse plate;
an insertion portion extending from said shaft portion in a rotation axial direction at a center portion of said shaft portion, and being inserted into said first and second holes; and
a protrusion portion protruding from said contacting surface of said shaft portion in said rotation axial direction around said insertion portion, said protrusion portion being engaged with said fitting portion of said washer.

16. A position detector according to claim 1, wherein said pulse plate is connected to said sun gear by fastening a top end of said protrusion portion to said fitting portion of said pulse plate.

* * * * *